(12) United States Patent
Cline et al.

(10) Patent No.: US 6,571,297 B1
(45) Date of Patent: May 27, 2003

(54) SERVICE INTERFACE REPOSITORY APPLICATION PROGRAMMING MODELS

(75) Inventors: Owen Richard Cline, Poway, CA (US); B. Charles Eutsler, Escondido, CA (US); My Tien Pare, San Diego, CA (US); Pamela Morgan Smurlo, San Diego, CA (US)

(73) Assignee: Bea Systems, Inc., San Jose, CA (US)

( * ) Notice: Subject to any disclaimer, the term of this patent is extended or adjusted under 35 U.S.C. 154(b) by 0 days.

(21) Appl. No.: 08/914,988

(22) Filed: Aug. 20, 1997

(51) Int. Cl.[7] .............................. G06F 9/46; G06F 9/00
(52) U.S. Cl. ....................................... 709/328
(58) Field of Search ................................ 709/328, 233, 709/331, 203, 201, 200; 717/2, 1, 103, 10; 707/103, 10

(56) References Cited

U.S. PATENT DOCUMENTS

| | | | | |
|---|---|---|---|---|
| 5,644,764 A | * | 7/1997 | Johnson et al. | 395/614 |
| 5,751,962 A | * | 5/1998 | Fanshier et al. | 395/200.53 |
| 5,758,348 A | * | 5/1998 | Neubauer | 707/103 |
| 5,758,351 A | * | 5/1998 | Gibson et al. | 707/104 |
| 5,884,317 A | * | 3/1999 | Cline et al. | 707/103 |
| 5,926,637 A | * | 7/1999 | Cline et al. | 395/701 |
| 5,960,421 A | * | 9/1999 | Cline et al. | 707/2 |
| 6,023,578 A | * | 2/2000 | Birsan et al. | 395/702 |
| 6,023,579 A | * | 2/2000 | Hellgren et al. | 395/702 |
| 6,038,395 A | * | 3/2000 | Chow et al. | 395/702 |

OTHER PUBLICATIONS

The Common Object Request Broker: Architecture and Specification, Revision 2.0. pp. 6–1 to 6–52, Jul. 1995.*

* cited by examiner

*Primary Examiner*—Sue Lao
(74) *Attorney, Agent, or Firm*—Fliesler Dubb Meyer & Lovejoy LLP

(57) ABSTRACT

A method, apparatus, and article of manufacture for facilitating the generation of tools and applications for a computer network. An access server, executed by a first computer, accesses interface definitions stored in a database. A data access library, coupled to the access server and executed by a second computer, provides the interface definitions to be stored in the database by the access server. A second server, coupled to the data access library and executed by a third computer, sends a request to the database through the access server, wherein the request maintains and uses the stored interface definitions. An application programming model, stored in the database, supports the unique identification of the interface definitions for a service in cases where multiple interface definitions exist for the service.

50 Claims, 2 Drawing Sheets

SERVICE INTERFACE REPOSITORY APPLICATION PROGRAMMING MODELS

CROSS-REFERENCE TO RELATED APPLICATIONS

This application is related to the following applications:

Application Ser. No. 08/915,124, entitled "SERVICE INTERFACE REPOSITORY," filed on same date herewith, by Owen R. Cline, et al.;

Application Ser. No. 08/195,434, entitled "SERVICE INTERFACE REPOSITORY INTERNATIONALIZATION," filed on same date herewith, by Owen R. Cline, et al.;

Application Ser. No. 08/914,991, entitled "SERVICE INTERFACE REPOSITORY CODE GENERATION DATA," filed on same date herewith, by Owen R. Cline, et al.;

Application Ser. No. 08/904,406, entitled "SOFTWARE INTERFACE ADAPTER FOR USE WITH MULTIPLE DEVELOPMENT TOOLS," filed on Jul. 31, 1997, by Jack P. Dundon, et al., now abandoned;

Application Ser. No. 08/904,401, entitled "SOFTWARE INTERFACE FOR DYNAMIC MAPPING," filed on Jul. 31, 1997, by Jack P. Dundon, et al.;

all of which are incorporated by reference herein.

BACKGROUND OF THE INVENTION

1. Field of the Invention

This invention relates in general to computer networks, and in particular to a tool for application development for object based computer networks.

2. Description of Related Art

An important trend in the industry is the development of client/server architectures in distributed computing environments to support transaction processing applications. Currently, distributed computing environments typically comprise interconnected mainframes, minicomputers, servers and workstations. This integration of mainframes, minicomputers, servers and workstations into a distributive computing environment creates the need for tools capable of operating in this environment, especially tools that assist in development of applications for distributed computing environments.

SUMMARY OF THE INVENTION

The present invention discloses a method, apparatus, and article of manufacture for a tool that assists in the development of applications for object based computer networks. An access server, executed by a first computer accesses interface definitions stored in a database. A data access library, coupled to the access server and executed by a second computer, provides the interface definitions to be stored in the database by the access server. A server, coupled to the data access library and executed by a third computer, sends requests to maintain and use stored interface definitions in the database. An application programming model, stored in the database, supports the unique identification of the interface definitions for a service in cases where multiple interface definitions exist for the service.

An object of the present invention is to provide tools to aid in interfacing with computer networks. Yet another object of the present invention is to provide an improved method of storing information on the networks and the components executed by the nodes. Still another object of the present invention is to provide a method for customers and third party vendors to define services with multiple interface definitions in such a way that source code can be generated for each interface definition.

BRIEF DESCRIPTION OF THE DRAWINGS

Referring now to the drawings in which like reference numbers represent corresponding parts throughout.

DETAILED DESCRIPTION OF THE PREFERRED EMBODIMENT

In the following description of the preferred embodiment, reference is made to the accompanying drawings which form a part hereof, and in which is shown by way of illustration a specific embodiment in which the invention may be practiced. It is to be understood that other embodiments may be utilized and structural changes may be made without departing from the scope of the present invention.

Overview

Figure 1:
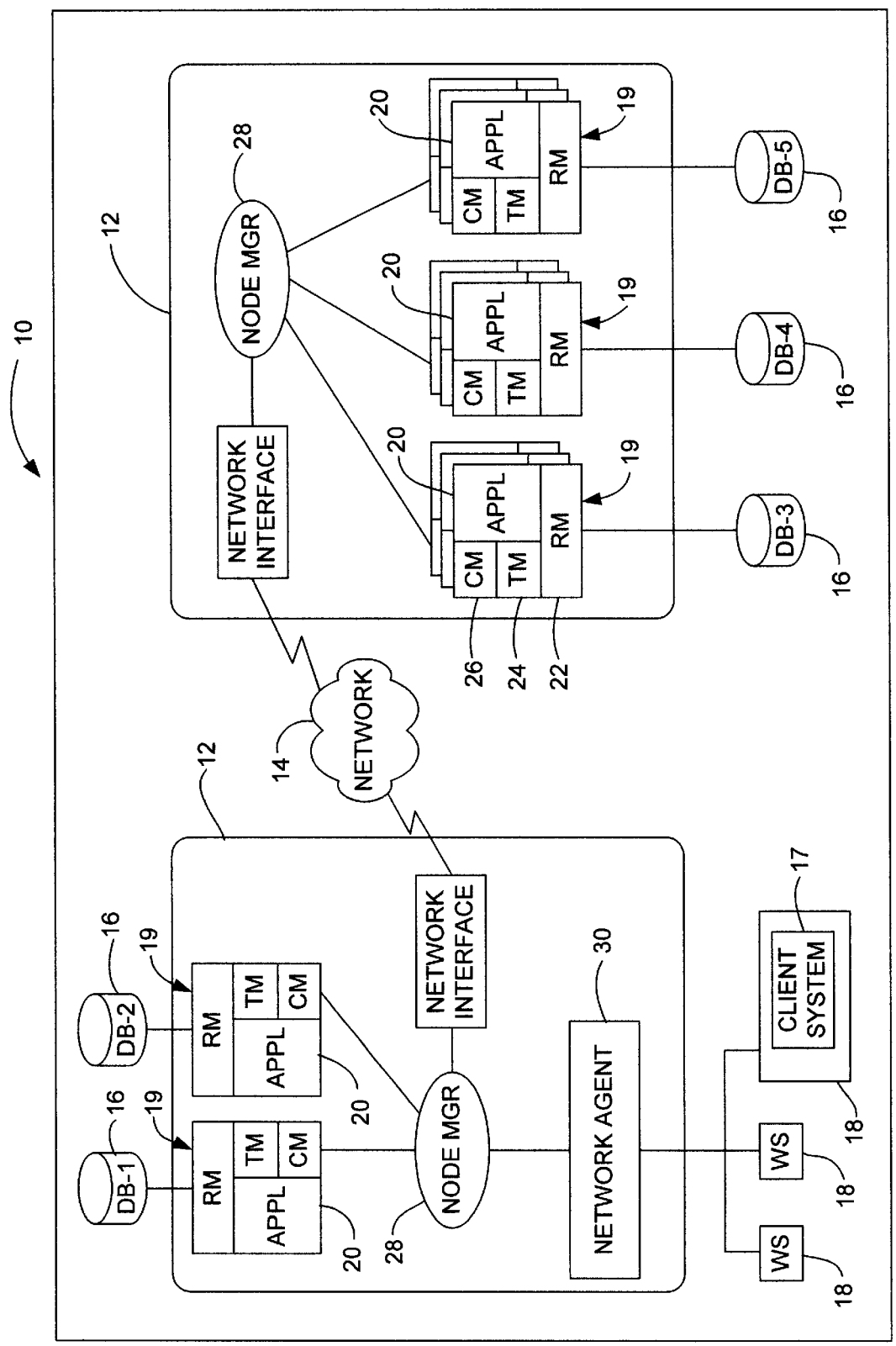
FIG. 1 is an exemplary illustration of a distributed computing environment known as a TOP END™ system.

FIG. 1 is an exemplary illustration of a distributed computing environment 10, known as a TOP END™ system. The present invention comprises a method, apparatus, and program product for facilitating the applications development in such distributed computing environments.

A TOP END™ system 10 is comprised of one or more nodes 12 interconnected by a network 14, wherein each of the nodes 12 is comprised of one or more computers. Each of the nodes 12 is typically coupled to one or more fixed and/or removable data storage units (DSUs) 16, such as disk drives, that store one or more databases.

In the exemplary environment of FIG. 1, a client-server architecture is disclosed. At least one of the nodes 12 provides the connection to client systems 17 operating on workstations 18. The client systems 17 can also be an application component 19 running inside the node 12. Operators of the TOP END™ system 10 use a workstation 18 or terminal to transmit electrical signals to and from server systems operating on the node 12 in the TOP END™ system 10, wherein the electrical signals represent commands for performing various services in the TOP END™ system 10, such as search and retrieval services against the databases. Those skilled in the art will recognize, however, that the present invention has application to any service or software that can be performed by a TOP END™ system 10.

According to the present invention, these services are divided into several modular components 19 that are designed for a distributed, message-passing computing environment. In TOP END™ terminology, a "component" 19 is a process or logical group of processes that performs one or more services. The components 19 work together to process distributed transactions initiated by the client systems 17.

Work is divided among the nodes 12 in the TOP END™ system 10 by spreading the location of these modular components across the nodes 12. Thus, each node 12 performs some localized service and work is managed by the TOP END™ system 10 so that a sequence of multiple services comprising a client system 17 request is performed by one or more of the modular components on one or more of the nodes 12 in the TOP END™ system 10.

The fundamental component in a TOP END™ system 10 is the application component 19. The application component 19 contains application code 20 that links with the libraries to create an application component 19. Application components 19 are used to create and grow distributed TOP END™ systems 10. The application components 19 could be user-written, provided as a solution by an independent vendor, or supplied as part of the TOP END™ system 10. In a TOP END™ system 10, libraries are available to an application component 19, including resource managers 22 such as database management systems (DBMS), transaction managers 24, and communications managers 26.

Another component of a TOP END™ system 10 is the node manager 28. The node manager 28 is a collection of processes that offer core services to coordinate processing among nodes 12. These processes, in general, work independently of each other. Services provided by the node manager 28 include transaction management (for example, commit coordination), logging, failure recovery, client/server request handling, security management, runtime administration, and application component 19 control.

Still another component of a TOP END™ system 10 is the network agent 30. Network agents 30 are used to allow transactions and service requests to enter a TOP END™ system 10 from an application component 19 or networked workstation 18 that does not have a node manager 28 on it.

Table 1 provides a listing for database objects and descriptions of items related to the Top End systems and components.

Service Interface Repository Description

Figure 2:
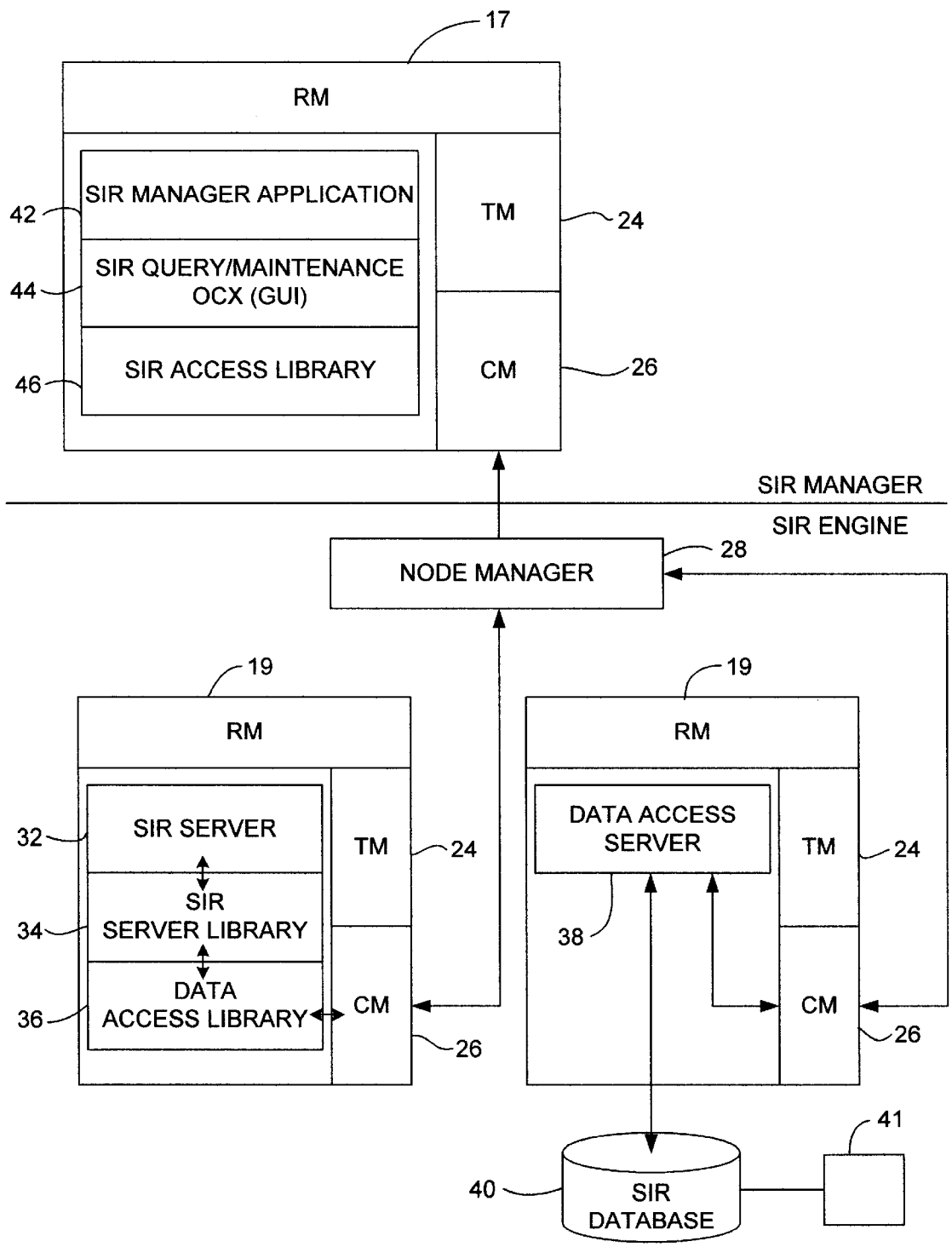
FIG. 2 illustrates the components of the present invention and their relationship to each other.

FIG. 2 illustrates the components of the present invention and their relationship to each other.

The Service Interface Repository (SIR) accelerates development of products, (i.e., combined client systems, application components, and resource managers) that work within the TOP END™ environment. The SIR allows users to store and retrieve the service interface definitions of these products. The definitions can then be used by tools that are integrated with the TOP END™ system 10, via the SIR, for generating code for these products. In addition to supporting code generators, a central repository also means that TOP END™ products and services can be more readily and easily used and reused in new product development. In terms of cost savings, a SIR means that code can be written faster, with fewer rewrites, and can be deployed into the field faster.

The SIR contains features that exceed the most basic information that is needed to generate code for TOP END™ products and services. These additional features include support for aggregate data types (structures, unions and tagged unions), user defined data types, code generation data (default values, validation specifications and Graphical User Interface (GUI) presentation hints), and support for runtime identification of repeating records, tagged unions and output buffers.

Every TOP END™ product is developed to provide one or more services. Each one of these services operates on client system 17 input data and responds to the client system 17 with output data. When requesting a service, a client system 17 needs to know the layout of the input data to send to the application component 19 and the layout of the output data it receives from the application component 19. The current method of developing client systems 17 is manual, such that the interfaces to services, such as the data layouts, are documented by the developer, and read by the client system 17 developer to manually generate client system 17 code. This manual generation of client system 17 code could be automated if the interfaces to services were defined and programmatically accessible.

Further, the simplification and generation features of the present invention can be applied to servers. For example, server definitions are placed into the SIR Database 40 and documentation, template server code, etc. would be generated.

The present invention is a collection of programs that store and retrieve TOP END™ service interface definitions. Definitions of services are stored in the SIR Database 40 either before or after any application using those definitions is written. The SIR can also be used to generate template applications. Since the present invention is not dependent on the actual running TOP ENDTM system 10, information can be stored in the present invention at any point in the development cycle.

A service interface definition is usually composed of a TOP END™ system 10, with at least one product, one or more services within each product, and the input data and output data for each service.

Input and output data is described using buffers. Multiple buffers indicating multiple protocols within each service are supported.

Buffers are made up of fields and each field has a type. Types can be one of the SIR base types, a user-defined typedef or an aggregate. In addition, code generation data can be specified for each field. Each field is also named such that code generators can use the names for variables and labels.

Further, buffers and aggregates (structures, unions, and tagged unions) can have fields with dynamic and static repetitions. The repetition field represents how many occurrences of the field are within the buffer or aggregate. For static repetitions, any positive non-zero constant integer value can be specified. Dynamic repetitions can either be end-of-buffer or a repeating record count. A repeating record count is a pointer to a preceding field that contains the count of the number of times that the field repeats. Repeating record count fields must precede the field and be of integer or ASCII numeric (precision 0) type. For aggregates, the end-of-buffer capabilities are not available.

As mentioned above, users are able to define their own data types. Users are able to define structures which allow a collection of fields (such as name and address) to be reused in the definitions of multiple services. Typedefs can be defined by tool integrators whose tools support data that can't be represented in terms of the SIR's predefined types. An example of this is the typical "datetime" data type which is supported by all commercial databases but whose internal representation is non-standard. By allowing user-defined typedefs, an "Oracle DateTime" data type can be defined. This data type is different than the "SQL Server DateTime" data type, which also may be defined.

Table 2 illustrates an example set of types utilized by the Service Interface Repository (SIR).

Unions and tagged unions can also be defined. Tagged unions provide assistance to code generation programs because there is a defined variable for runtime identification of the union contents. The type of the tag is specified by the user and can be a 1, 2 or 4 byte binary field, or an ASCII numeric field of a length specified by the user.

Buffers, fields, aggregates and types are reusable objects which can be used in the definition of multiple objects.

The present invention also supports unrestricted categories (or groupings) of objects. Multiple levels of categories can be used to organize system/product/service groupings into a hierarchy. Multiple category paths to the same system/product/service grouping are allowed.

The present invention supports product development in a TOP END™ system 10 as well as third parties who wish to integrate their development tools with the TOP END™ system 10.

For example, a code generator is a type of tool integration. A code generator uses the present invention to display the available products and services and retrieve the definition of the TOP END™ products and services the user selects. The code generator uses the interface definition to generate a client system 17 application for that tool's development environment.

It is envisioned that the present invention can be used by tool vendors who are performing an integration with TOP END™ via the SIR, and by developers who are using the integrated tool (developed by the tool vendor) to create an actual client system 17. The developer can then deploy their client system 17. Further, a customer can integrate the SIR into a custom development environment, or create utilities that generate files that are read in and customized by existing development environments. The simplification and generation features of the present invention can also be applied to servers within the distributed processing system. For example, server definitions are placed into the SIR Database 40 and documentation, template server code, etc. would be generated.

Detailed Description of the Service Interface Repository

The SIR is a collection of programs and libraries for maintaining and accessing a repository of service interface definitions. These programs and libraries can be broken into two groups: the SIR Manager and the SIR Engine.

As shown in FIG. 2, the SIR Engine is comprised of the SIR Server 32, the SIR Server Library 34, the Data Access Library 36, the Data Access Server 38, and the SIR Database 40. The SIR Manager is comprised of the SIR Manager Application 42, the SIR Query/Maintenance Object Linking and Embedding (OLE) Control Library (OCX) 44, and the SIR Access Library 46. The SIR Manager components are typically resident on a client system 17. The SIR Manager and the SIR Engine are described in more detail in U.S. patent application Ser. No. 08/915,124 entitled "SERVICE INTERFACE REPOSITORY," filed on same date herewith, by Owen R. Cline et al., which is incorporated by reference herein.

Detailed Description of the Application Programming Models

The present invention assists the programmer by supplying application programming models 41 that are stored in the SIR Database 40 and allow developers to qualify and uniquely identify the application interfaces within a service at the buffer level. Once buffers are uniquely identified both manual coding and automatic code generation of client systems 17 can be more easily accomplished.

For a given client system 17, knowing all of the protocol messages may be insufficient to generate a complimentary client system 17. Where protocols for an application interface are ambiguous, a client system 17 developer must know how a server 38 uses an application interface and under what circumstances a server 38 uses those interfaces. Application program model 41 assists the client system 17 developer in resolving those ambiguities.

The SIR defines several application programming models 41 which can be stored in the SIR Database 40, e.g., FREE FORM, ONE BUFFER, ONE INPUT ONE OUTPUT, MULTIPLE INPUT MULTIPLE OUTPUT USES FORMATS, and MULTIPLE INPUT MULTIPLE OUTPUT USES SELECTOR, to identify the buffer definitions within a client system 17 that may vary at the time the client system 17 is run on the computer. The client system 17 can define multiple buffers (interface definitions) under the present invention, and the buffers can be identified at run time, at development time, or anywhere in between throughout the development of client system 17. Further, through the application programming model 41, buffer definitions can be created without requiring changes to the server's 38 physical buffers and need not contain information that uniquely identifies the buffers in a run time situation.

For example, if a service is using formats the interface definition of the service can be defined as following the MULTIPLE INPUT MULTIPLE OUTPUT USES FORMATS model. This means that identification of the buffers at run time is done using the format names that are sent to and returned from the service call as part of the header information. In this case no change needs to be made to the service.

Another example is where the application programming model 41 defines a MULTIPLE INPUT MULTIPLE OUTPUT USES SELECTOR model that allows the developer to identify multiple input and output buffers at run time. The message being sent to and returned from the server 38 is prefixed with the selector value. In this case, the selector is not defined as part of the actual buffer. Further, tagged union structures can uniquely identify the contents of a union in a similar fashion.

The identification of buffers can also be applied to servers. For example, server definitions which adhere to the application programming models 41 are placed into the SIR Database 40 and template server code would be generated.

Conclusion

In summary, the present invention discloses a method, apparatus, and article of manufacture for a tool that assists in the development of applications for object-based computer networks. An access server, executed by a first computer, accesses interface definitions stored in a database. A data access library, coupled to the access server and executed by a second computer, provides the interface definitions to be stored in the database by the access server. A second server, coupled to the data access library and executed by a third computer, sends a request to the database through the access server, wherein the request maintains and uses the stored interface definitions. An application programming model, stored in the database, supports the unique identification of the interface definitions for a service in cases where multiple interface definitions exist for the service.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A programming tool for a distributed processing system, allowing a client-based system to specify service interfaces to be utilized in the development and execution of software applications, comprising:

a service interface definition database, including for a particular service a plurality of service interface definitions, each of said plurality of service interface definitions defining an input and output data format for said particular service;

an access server, executed by a first computer, for storing and retrieving service interface definitions in said service interface definition database;

a client process, executed by a second computer, for specifying a set of input and output data format requirements, and for sending a service interface request to said access server to retrieve a set of said service interface definitions for said particular service, for use in developing or executing a software application;

a data access library, executed by a third computer, for mapping said service interface requests between said client process and said access server; and, an application programming model for identifying, within said plurality of service interface definitions, a particular service interface definition matching said input and output data format requirements, to be returned to said client process in response to said service interface request, wherein said input and output data formats are specified at the buffer level.

2. The programming tool of claim 1, wherein the first computer, the second computer, and the third computer are the same computer.

3. The programming tool of claim 1, wherein the application programming model is a free form model.

4. The programming tool of claim 1, wherein the application programming model is a one buffer model.

5. The programming tool of claim 1, wherein the application programming model is a one input one output model.

6. The programming tool of claim 1, wherein the application programming model is a multiple input multiple output uses formats model.

7. The programming tool of claim 1, wherein the application programming model is a multiple input multiple output uses selector model.

8. The programming tool of claim 1 wherein said particular service is a TOP END service.

9. The programming tool of claim 8 wherein each of said plurality of service interface definitions defines a TOP END service having multiple TOP END application interfaces.

10. The programming tool of claim 8 wherein said plurality of service interface definitions define a TOP END application product, and the input and output data formats for said TOP END application product.

11. A system for software application code generation in a distributed computing environment, comprising:

a service interface definition database, including for a particular service a plurality of service interface definitions, each of said plurality of service interface definitions defining an input and output data format for said particular service;

an access server, executed by a first computer, for storing and retrieving service interface definitions in said service interface definition database;

a client process, executed by a second computer, for specifying a set of input and output data format requirements, and for sending a service interface request to said access server to retrieve a set of said service interface definitions for said particular service, for use in generating a software application;

a data access library, executed by a third computer, for mapping said service interface requests between said client process and said access server; and, an application programming model for identifying, within said plurality of service interface definitions, a particular service interface definition matching said input and output data format requirements, to be returned to said client process in response to said service interface request, and for allowing the generation of software application code using said identified service interface definition, wherein said input and output data formats are specified at the buffer level.

12. The system of claim 11, wherein said first computer, said second computer, and said third computer are the same computer.

13. The system of claim 11, wherein said application programming model is stored in said service interface definition database as a free form model.

14. The system of claim 11, wherein said application programming model is stored in said service interface definition database as a one buffer model.

15. The system of claim 11, wherein said application programming model is stored in said service interface definition database as a one input one output model.

16. The system of claim 11, wherein said application programming model is stored in said service interface definition database as a multiple input multiple output uses formats model.

17. The system of claim 11, wherein said application programming model is stored in said service interface definition database as a multiple input multiple output uses selector model.

18. The system of claim 11 wherein said particular service is a TOP END service.

19. The system of claim 18 wherein each of said service interface definitions defines a TOP END service having multiple TOP END application interfaces.

20. The system of claim 18 wherein said plurality of service interface definitions define a TOP END application product, and the input and output data formats for said TOP END application product.

21. A method of generating software application code in a distributed environment, comprising the steps of:

specifying a set of input and output data format requirements for interacting with a particular service;

sending a service interface request to an access server to retrieve from a service interface definition database a set of service interface definitions for said particular service;

identifying, using an application programming model, within said service interface definition database, a particular interface definition matching said input and output data format requirements;

retrieving from said service interface definition database the service interface definition identified by said application programming model; and, generating software application code using said identified service interface definition, wherein said input and output data formats are specified at the buffer level.

22. The method of claim 21, wherein said first computer, said second computer, and said third computer are the same computer.

23. The method of claim 21, wherein said application programming model is stored in said service interface definition database as a free form model.

24. The method of claim 21, wherein said application programming model is stored in said service interface definition database as a one buffer model.

25. The method of claim 21, wherein said application programming model is stored in said service interface definition database as a one input one output model.

26. The method of claim 21, wherein said application programming model is stored in said service interface definition database as a multiple input multiple output uses formats model.

27. The method of claim 21, wherein said application programming model is stored in said service interface definition database as a multiple input multiple output uses selector model.

28. The method of claim 21 wherein said particular service is a TOP END service.

29. The method of claim 28 wherein each of said service interface definitions defines a TOP END service having multiple TOP END application interfaces.

30. The method of claim 28 wherein said plurality of service interface definitions define a TOP END application product, and the input and output data formats for said TOP END application product.

31. A program storage device having computer-readable instructions stored thereon which when executed cause the computer to perform the steps of:
  specifying a set of input and output data format requirements for interacting with a particular service;
  sending a service interface request to an access server to retrieve from a service interface definition database a set of service interface definitions for said particular service;
  identifying, using an application programming model, within said service interface definition database, a particular interface definition matching said input and output data format requirements;
  retrieving from said service interface definition database the service interface definition identified by said application programming model; and,
  generating software application code using said identified service interface definition, wherein said input and output data formats are specified at the buffer level.

32. The program storage device of claim 31, wherein said first computer, said second computer, and said third computer are the same computer.

33. The program storage device of claim 31, wherein said application programming model is stored in said service interface definition database as a free form model.

34. The program storage device of claim 31, wherein said application programming model is stored in said service interface definition database as a one buffer model.

35. The program storage device of claim 31, wherein said application programming model is stored in said service interface definition database as a one input one output model.

36. The program storage device of claim 31, wherein said application programming model is stored in said service interface definition database as a multiple input multiple output uses formats model.

37. The program storage device of claim 31, wherein said application programming model is stored in said service interface definition database as a multiple input multiple output uses selector model.

38. The program storage device of claim 31 wherein said particular service is a TOP END service.

39. The program storage device of claim 38 wherein each of said service interface definitions defines a TOP END service having multiple TOP END application interfaces.

40. The program storage device of claim 38 wherein said plurality of service interface definitions define a TOP END application product, and the input and output data formats for said TOP END application product.

41. A programming tool for a distributed processing system, allowing a client-based system to specify service interfaces to be utilized in the development and execution of software applications, comprising:
  a service interface definition database, including for a particular service a plurality of service interface definitions, each of said plurality of service interface definitions defining an input and output data format for said particular service;
  an access server, executed by a first computer, for storing and retrieving service interface definitions in said service interface definition database;
  a client process, executed by a second computer, for specifying a set of input and output data format requirements, and for sending a service interface request to said access server to retrieve a set of said service interface definitions for said particular service, for use in developing or executing a software application;
  a data access library, executed by a third computer, for mapping said service interface requests between said client process and said access server; and,
  an application programming model for identifying, within said plurality of service interface definitions, a particular service interface definition matching said input and output data format requirements, to be returned to said client process in response to said service interface request, wherein the application programming model is a free form model.

42. A programming tool for a distributed processing system, allowing a client-based system to specify service interfaces to be utilized in the development and execution of software applications, comprising:
  a service interface definition database, including for a particular service a plurality of service interface definitions, each of said plurality of service interface definitions defining an input and output data format for said particular service;
  an access server, executed by a first computer, for storing and retrieving service interface definitions in said service interface definition database;
  a client process, executed by a second computer, for specifying a set of input and output data format requirements, and for sending a service interface request to said access server to retrieve a set of said service interface definitions for said particular service, for use in developing or executing a software application;
  a data access library, executed by a third computer, for mapping said service interface requests between said client process and said access server; and,
  an application programming model for identifying, within said plurality of service interface definitions, a particular service interface definition matching said input and output data format requirements, to be returned to said client process in response to said service interface request, wherein the application programming model is a one buffer model.

43. A programming tool for a distributed processing system, allowing a client-based system to specify service interfaces to be utilized in the development and execution of software applications, comprising:
  a service interface definition database, including for a particular service a plurality of service interface definitions, each of said plurality of service interface definitions defining an input and output data format for said particular service;
  an access server, executed by a first computer, for storing and retrieving service interface definitions in said service interface definition database;
  a client process, executed by a second computer, for specifying a set of input and output data format requirements, and for sending a service interface request to said access server to retrieve a set of said service interface definitions for said particular service, for use in developing or executing a software application;

a data access library, executed by a third computer, for mapping said service interface requests between said client process and said access server; and, an application programming model for identifying, within said plurality of service interface definitions, a particular service interface definition matching said input and output data format requirements, to be returned to said client process in response to said service interface request, wherein the application programming model is a one input one output model.

44. A programming tool for a distributed processing system, allowing a client-based system to specify service interfaces to be utilized in the development and execution of software applications, comprising:

a service interface definition database, including for a particular service a plurality of service interface definitions, each of said plurality of service interface definitions defining an input and output data format for said particular service;

an access server, executed by a first computer, for storing and retrieving service interface definitions in said service interface definition database;

a client process, executed by a second computer, for specifying a set of input and output data format requirements, and for sending a service interface request to said access server to retrieve a set of said service interface definitions for said particular service, for use in developing or executing a software application;

a data access library, executed by a third computer, for mapping said service interface requests between said client process and said access server; and, an application programming model for identifying, within said plurality of service interface definitions, a particular service interface definition matching said input and output data format requirements, to be returned to said client process in response to said service interface request, wherein the application programming model is a multiple input multiple output uses formats model.

45. A programming tool for a distributed processing system, allowing a client-based system to specify service interfaces to be utilized in the development and execution of software applications, comprising:

a service interface definition database, including for a particular service a plurality of service interface definitions, each of said plurality of service interface definitions defining an input and output data format for said particular service;

an access server, executed by a first computer, for storing and retrieving service interface definitions in said service interface definition database;

a client process, executed by a second computer, for specifying a set of input and output data format requirements, and for sending a service interface request to said access server to retrieve a set of said service interface definitions for said particular service, for use in developing or executing a software application;

a data access library, executed by a third computer, for mapping said service interface requests between said client process and said access server; and, an application programming model for identifying, within said plurality of service interface definitions, a particular service interface definition matching said input and output data format requirements, to be returned to said client process in response to said service interface request, wherein the application programming model is a multiple input multiple output uses selector model.

46. A system for software application code generation in a distributed computing environment, comprising:

a service interface definition database, including for a particular service a plurality of service interface definitions, each of said plurality of service interface definitions defining an input and output data format for said particular service;

an access server, executed by a first computer, for storing and retrieving service interface definitions in said service interface definition database;

a client process, executed by a second computer, for specifying a set of input and output data format requirements, and for sending a service interface request to said access server to retrieve a set of said service interface definitions for said particular service, for use in generating a software application;

a data access library, executed by a third computer, for mapping said service interface requests between said client process and said access server; and, an application programming model for identifying, within said plurality of service interface definitions, a particular service interface definition matching said input and output data format requirements, to be returned to said client process in response to said service interface request, and for allowing the generation of software application code using said identified service interface definition, wherein said application programming model is stored in said service interface definition database as a free form model.

47. A system for software application code generation in a distributed computing environment, comprising:

a service interface definition database, including for a particular service a plurality of service interface definitions, each of said plurality of service interface definitions defining an input and output data format for said particular service;

an access server, executed by a first computer, for storing and retrieving service interface definitions in said service interface definition database;

a client process, executed by a second computer, for specifying a set of input and output data format requirements, and for sending a service interface request to said access server to retrieve a set of said service interface definitions for said particular service, for use in generating a software application;

a data access library, executed by a third computer, for mapping said service interface requests between said client process and said access server; and, an application programming model for identifying, within said plurality of service interface definitions, a particular service interface definition matching said input and output data format requirements, to be returned to said client process in response to said service interface request, and for allowing the generation of software application code using said identified service interface definition, wherein said application programming model is stored in said service interface definition database as a one buffer model.

48. A system for software application code generation in a distributed computing environment, comprising:
- a service interface definition database, including for a particular service a plurality of service interface definitions, each of said plurality of service interface definitions defining an input and output data format for said particular service;
- an access server, executed by a first computer, for storing and retrieving service interface definitions in said service interface definition database;
- a client process, executed by a second computer, for specifying a set of input and output data format requirements, and for sending a service interface request to said access server to retrieve a set of said service interface definitions for said particular service, for use in generating a software application;
- a data access library, executed by a third computer, for mapping said service interface requests between said client process and said access server; and,
- an application programming model for identifying, within said plurality of service interface definitions, a particular service interface definition matching said input and output data format requirements, to be returned to said client process in response to said service interface request, and for allowing the generation of software application code using said identified service interface definition, wherein said application programming model is stored in said service interface definition database as a one input one output model.

49. A system for software application code generation in a distributed computing environment, comprising:
- a service interface definition database, including for a particular service a plurality of service interface definitions, each of said plurality of service interface definitions defining an input and output data format for said particular service;
- an access server, executed by a first computer, for storing and retrieving service interface definitions in said service interface definition database;
- a client process, executed by a second computer, for specifying a set of input and output data format requirements, and for sending a service interface request to said access server to retrieve a set of said service interface definitions for said particular service, for use in generating a software application;
- a data access library, executed by a third computer, for mapping said service interface requests between said client process and said access server; and,
- an application programming model for identifying, within said plurality of service interface definitions, a particular service interface definition matching said input and output data format requirements, to be returned to said client process in response to said service interface request, and for allowing the generation of software application code using said identified service interface definition, wherein said application programming model is stored in said service interface definition database as a multiple input multiple output uses formats model.

50. A system for software application code generation in a distributed computing environment, comprising:
- a service interface definition database, including for a particular service a plurality of service interface definitions, each of said plurality of service interface definitions defining an input and output data format for said particular service;
- an access server, executed by a first computer, for storing and retrieving service interface definitions in said service interface definition database;
- a client process, executed by a second computer, for specifying a set of input and output data format requirements, and for sending a service interface request to said access server to retrieve a set of said service interface definitions for said particular service, for use in generating a software application;
- a data access library, executed by a third computer, for mapping said service interface requests between said client process and said access server; and,
- an application programming model for identifying, within said plurality of service interface definitions, a particular service interface definition matching said input and output data format requirements, to be returned to said client process in response to said service interface request, and for allowing the generation of software application code using said identified service interface definition, wherein said application programming model is stored in said service interface definition database as a multiple input multiple output uses selector model.

* * * * *